United States Patent
Thesling et al.

(10) Patent No.: US 8,306,155 B2
(45) Date of Patent: Nov. 6, 2012

(54) FRAME-BASED CARRIER FREQUENCY AND PHASE RECOVERY SYSTEM AND METHOD

(75) Inventors: William Thesling, Hudson, OH (US); Fan Mo, Stow, OH (US)

(73) Assignee: ViaSat, Inc., Carlsbad, CA (US)

( * ) Notice: Subject to any disclaimer, the term of this patent is extended or adjusted under 35 U.S.C. 154(b) by 151 days.

(21) Appl. No.: 12/707,736

(22) Filed: Feb. 18, 2010

(65) Prior Publication Data

US 2010/0142651 A1  Jun. 10, 2010

Related U.S. Application Data

(63) Continuation of application No. 12/235,004, filed on Sep. 22, 2008, now Pat. No. 7,693,245, which is a continuation of application No. 11/240,996, filed on Sep. 30, 2005, now Pat. No. 7,443,920.

(60) Provisional application No. 60/614,770, filed on Sep. 30, 2004.

(51) Int. Cl.
*H04L 27/00* (2006.01)

(52) U.S. Cl. ...... 375/326; 178/20.04; 331/20; 340/3.21; 348/526; 348/538

(58) Field of Classification Search ............ None
See application file for complete search history.

(56) References Cited

U.S. PATENT DOCUMENTS

| | | |
|---|---|---|
| 4,905,177 A | 2/1990 | Weaver et al. |
| 5,673,363 A | 9/1997 | Jeon et al. |
| 6,456,672 B1 * | 9/2002 | Uchiki et al. ............ 375/344 |
| 2004/0252229 A1 * | 12/2004 | Jiang et al. ............ 348/385.1 |
| 2005/0278403 A1 | 12/2005 | Miller |
| 2006/0191400 A1 | 8/2006 | Puterbaugh et al. |

* cited by examiner

*Primary Examiner* — David C. Payne
*Assistant Examiner* — Adolf DSouza
(74) *Attorney, Agent, or Firm* — Kilpatrick Townsend & Stockton LLP

(57) ABSTRACT

Header information is used to facilitate coarse frequency and frame recovery. The coarse frequency and frame recovery is thereafter utilized to perform adaptive phase and frequency synchronization on a frame-by-frame basis. In one aspect, a frame identifier in a physical layer header of the digitized signal is utilized to estimate a first phase associated with the frame identifier. The remaining portion of the physical layer header is utilized to estimate a second phase associated with the remaining portion. The first phase estimate and the second phase estimate are combined to generate a first combined phase estimate.

19 Claims, 12 Drawing Sheets

FRAME-BASED CARRIER FREQUENCY AND PHASE RECOVERY SYSTEM AND METHOD

This application is a continuation of U.S. patent application Ser. No. 12/235,004, entitled "Frame-Based Carrier Frequency and Phase Recovery System and Method," filed Sep. 22, 2008, which is a continuation of U.S. Pat No. 7,443,920, entitled "Frame-Based Carrier Frequency and Phase Recovery System and Method," filed Sep. 30, 2005, which claims the benefit of U.S. Provisional Patent Application Ser. No. 60/614,770 entitled "Carrier Frequency and Phase Recovery for Systems Applying Variable/Adaptive Coding and Modulation in a Frame-By-Frame Basis," and filed on Sep. 30, 2004, the entire disclosures of which are incorporated herein by reference for all purposes.

BACKGROUND AND SUMMARY

In recent years, the advances in Forward-Error-Correction (FEC) and Bandwidth-Efficient Modulation (BEM) techniques have improved system capacity and service quality of various telecommunications significantly. For certain type of communications that are point-to-point and interactive, Variable Coding and Modulation (VCM) and Adaptive Coding and Modulation (ACM) techniques have the potential to further increase the system capacity as compared to a Constant Coding and Modulation (CCM) scheme. According to the message types and the link condition, a VCM or ACM transmitter utilizes FEC codes of various rates, sizes, utilizes modulations of different orders, and may include pilots to communicate to users with maximum efficiency. High rate codes and high order modulations are used to take advantage of favorable channel conditions while low rate codes and low order modulations are used to guarantee error free transmission when the channel conditions degrade.

Symbol timing, as well as carrier frequency and phase recovery for a VCM or ACM, presents several unique challenges. First, the application of near-Shannon-limit FEC codes demands the system to operate at lower and lower SNR levels. Second, the modulation scheme and the presence or absence of pilot symbols may be changed on a per-frame basis, which results in variable-length frames that preclude the application of conventional continuous phase recovery methods.

Novel receiver systems and methods are disclosed herein. Header information is used to facilitate coarse frequency and frame recovery. The coarse frequency and frame recovery is thereafter utilized to perform adaptive phase and frequency synchronization on a frame-by-frame basis.

DRAWINGS

DETAILED DESCRIPTION

Figure 1A:
FIG. 1A is an example frame format in a frame-based system.

In VCM and ACM systems, the highest channel capacity is achieved when the change of codeword sizes, code rates, modulation schemes and pilot insertion, etc., can be facilitated on a per-user basis. FIG. 1A is an example frame format 10 in such a frame-based system. A frame header 12 includes a frame identifier 14 and a frame signaling 16. The frame identifier 14 typically comprises one of a set of unique identifiers so that its known sequence may be readily identified. The remainder of the frame header, the frame signaling 16, typically includes modulation and coding data relating to the modulation and coding of encoded and modulated payload data 18 that follows the header 12. The header 12 is typically protected by very low code rates so that it may be received during poor SNR conditions. The encoded and modulated payload data 18, however, is adaptively coded on a per-user basis. For example, a terminal receiving a transmitted signal at a very low SNR may receive a frame 10 in which the encoded and modulated payload data 18 has been encoded at a very low code rate and at a very low order modulation. Conversely, a terminal receiving a transmitted signal at a very high SNR may receive a frame 10 in which the encoded and modulated payload data 18 has been encoded at a very high code rate and at a very high order modulation.

Figure 1B:
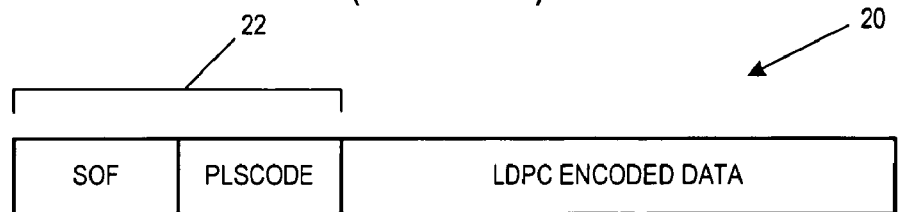
FIG. 1B is an example frame format in a DVB-S2 system.

FIG. 1B is an example frame format 20 in a DVB-S2 system. A header 22 includes a Start of Frame (SOF) 24 and the Physical Layer Signaling (PLS) code (PLSCODE) 26.

The SOF 24 is a known 26-symbol pattern. The PLSCODE 26 is a 64-bit linear binary code, which conveys seven bits of information with a minimum distance 32, i.e., a [64, 7, 32] code. In total, the SOF 24 and PLSCODE 26 occupy 90 symbols. The seven bits carried by the PLSCODE 26 inform receivers about the modulation scheme, code rate, pilot configuration, and length of the low density parity code (LDPC) coded data 28 that follows the header 22. The PLSCODE 26 is protected by an extremely low rate code and uses π/2 Binary Phase Shift Keying (BPSK) modulation to ensure that it can be read correctly even in very poor SNR conditions.

Figure 2:
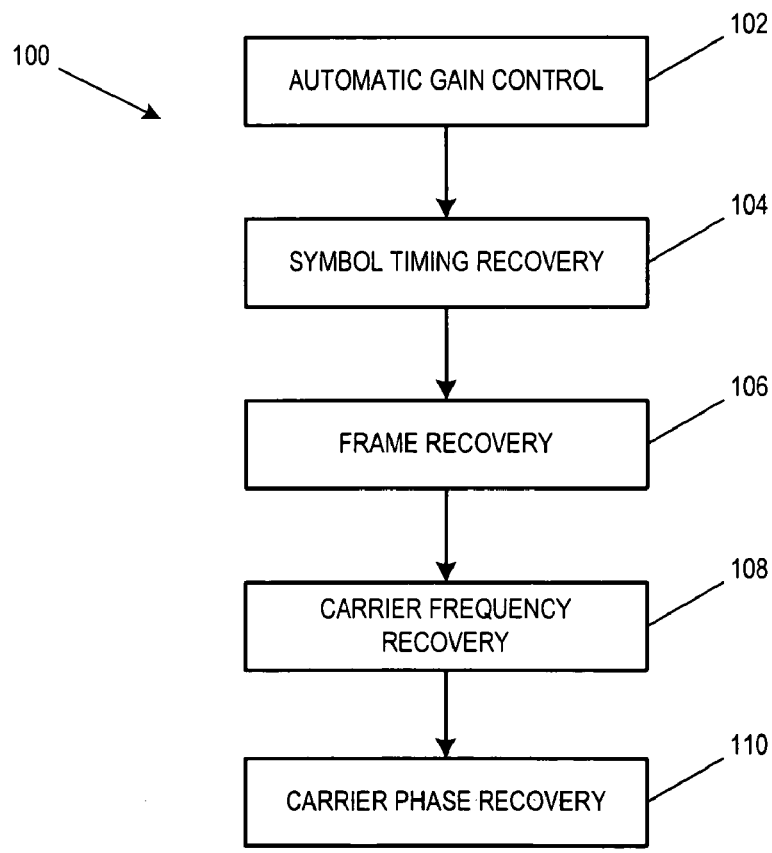
FIG. 2 is a flow diagram illustrating an example process for modem synchronization.

FIG. 2 is a flow diagram 100 illustrating an example process for modem synchronization. In general, receive modem synchronization comprises acquisition and tracking operations. Step 102 comprises an automatic gain control (AGC) process. An example AGC process comprises conventional energy measurement techniques using a standard proportional, integral, differential (PID) control loop.

Step 104 comprises a symbol timing recovery process. Symbol timing recovery may be implemented using conventional square-law detection. A square-law detector, however, may be adversely affected by the different constellations applied in consecutive frames resulting in different eye diagram characteristics. A terminal with a low SNR needs to acquire and maintain symbol timing regardless of the modulation format used, even when higher order modulation frames that cannot be successfully decoded by this user are transmitted. Longer averaging (or tighter filtering) on the symbol timing recovery control loops can be used to resolve this problem. While longer averaging may result in slower symbol timing acquisition and tracking, this aspect of the modem functionality is typically rapid and the extra time associated with this symbol timing acquisition is often negligible. The slower tracking rate associated with the tighter filtering results in a reduced tolerance to the symbol timing jitter (usually dictated by the transmitter) but this, too, is often negligible since the symbol timing jitter is seldom an issue until symbol rates become very low.

Step 106 comprises a frame recovery process. The frame recovery process 106 may include identifying a unique frame identifier. In VCM and ACM systems, there is an uncertain gap between subsequent headers caused by variable code block sizes. The location of the next frame identifier and frame is included in the current frame header, and thus is unknown unless the header information for the current frame has been correctly extracted. The frame recovery process 106 is further complicated by an initial lack of carrier frequency and phase information. Moreover, owing to varying frame modulation formats due to VCM or ACM, the carrier frequency and phase cannot be obtained from the subsequent carrier frequency recovery process 108 and the carrier phase recovery process 110 without first obtaining frame synchronization. As such, innovative carrier frequency and phase recovery methods have to be found to facilitate VCM and ACM demodulation.

Thus, disclosed herein is a novel frame-based carrier frequency and phase recovery system and method. This patent disclosure describes systems and methods to facilitate carrier frequency and phase recovery to facilitate efficient VCM or ACM reception and operation. Additionally, this disclosure describes systems and methods to extract the carrier frequency and phase recovery throughout the frames after automatic gain control and symbol timing recovery has been achieved. Example embodiments of the frame-based carrier frequency and phase recovery systems and methods are described in the context of a DVB-S2 communication system; however, the frame-based carrier frequency and phase recovery systems and methods described herein may be applied to other frame-based communication systems.

Figure 3:
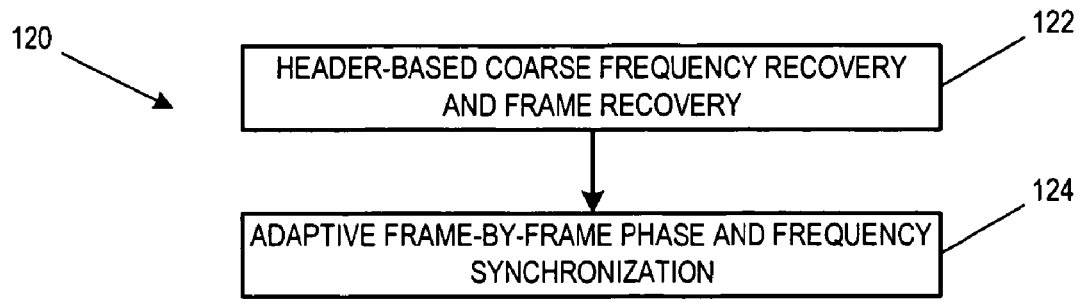
FIG. 3 is a flow diagram illustrating an example process for carrier and frequency recovery.

FIG. 3 is a flow diagram illustrating an example process 120 for carrier and frequency recovery. Step 122 comprises a header-based coarse frequency recovery and frame recovery process. The header-based coarse frequency recovery and frame recovery process 122 is suitable for low phase noise and thermal noise conditions. Step 124 comprises an adaptive frame-by-frame phase and frequency synchronization process. Step 124 may be performed in conjunction with step 122 to handle more severe phase noise conditions.

Figure 4:
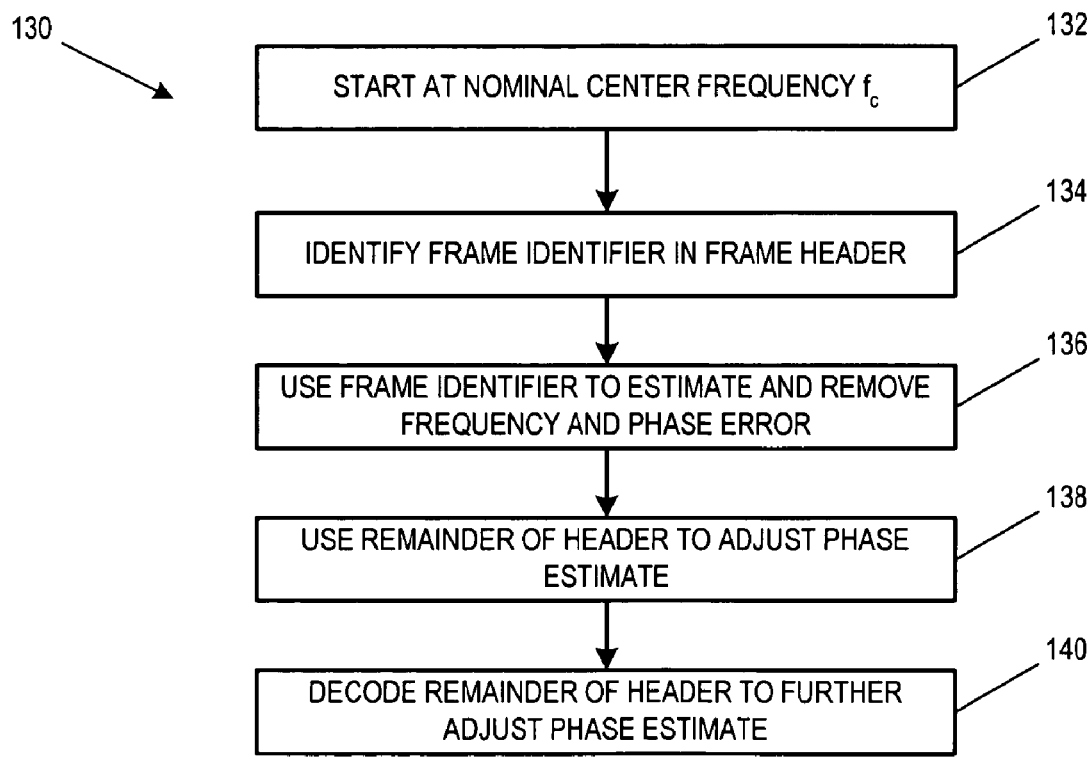
FIG. 4 is a flow diagram illustrating an example process for coarse frequency and frame recovery.

FIG. 4 is a flow diagram illustrating an example process 130 for coarse frequency and frame recovery. In a VCM or ACM system, carrier recovery begins by utilizing the header information. Because the header symbols are protected by a low code rate, the header can be detected even in very poor SNR conditions. Detecting and decoding the header information provides signaling information such as the modulation format, the presence or absence of pilot symbols, and other required signaling information for the following data.

The known frame identifier is utilized to first estimate the frequency and phase. Thereafter, the remainder of the header is read utilizing the initial frequency estimate from the frame identifier to refine the frequency and phase estimate. Simultaneous to this process, the frame recovery occurs and the frequency error and the phase error are removed.

The coarse frequency and frame recovery process 130 begins at step 132 by selecting a nominal center frequency $f_c$ for processing an input signal. The center frequency $f_c$ may be selected based upon a bandwidth allocation as defined by a governing communication protocol. In one embodiment, the center frequency $f_c$ corresponds to a first frequency parameter in a frequency sweep across the bandwidth allocation. In another embodiment, the center frequency fc corresponds to a random frequency parameter in a random frequency hop across the bandwidth allocation.

Step 134 identifies a frame identifier in the frame header. In one embodiment, the frame identifier may be identified by correlating the input signal to one or more known frame identifiers. In an example DVB-S2 embodiment, the input signal may be correlated to the known SOF 24 pattern. If the frame identifiers define a set of unique patterns, e.g., a particular communication system may have a specified set of 8 valid frame identifiers, then the input signal may be correlated to each of the 8 valid frame identifiers.

Step 136 utilizes the identified frame identifier to estimate and remove frequency and phase errors. In one embodiment, the frame identifier is converted to a tone and the frequency error is corrected based on the tone. The phase of the frame identifier is thereafter calculated based on the converted frame identifier.

Step 138 utilizes the remainder of the header to adjust the phase estimate. In one embodiment, the phase of the remainder of the header symbols is calculated and combined with the phase estimate obtained from the frame identifier.

Step 140 decodes the remainder of the header to further adjust the phase estimate. In one embodiment, the decoded remainder of the header is re-coded and re-modulated to generate an ideal remainder of the header. The ideal remainder of the header is then used in determining a phase estimate for the received remainder of the header that is combined with the phase estimate of the frame identifier.

Figure 5:
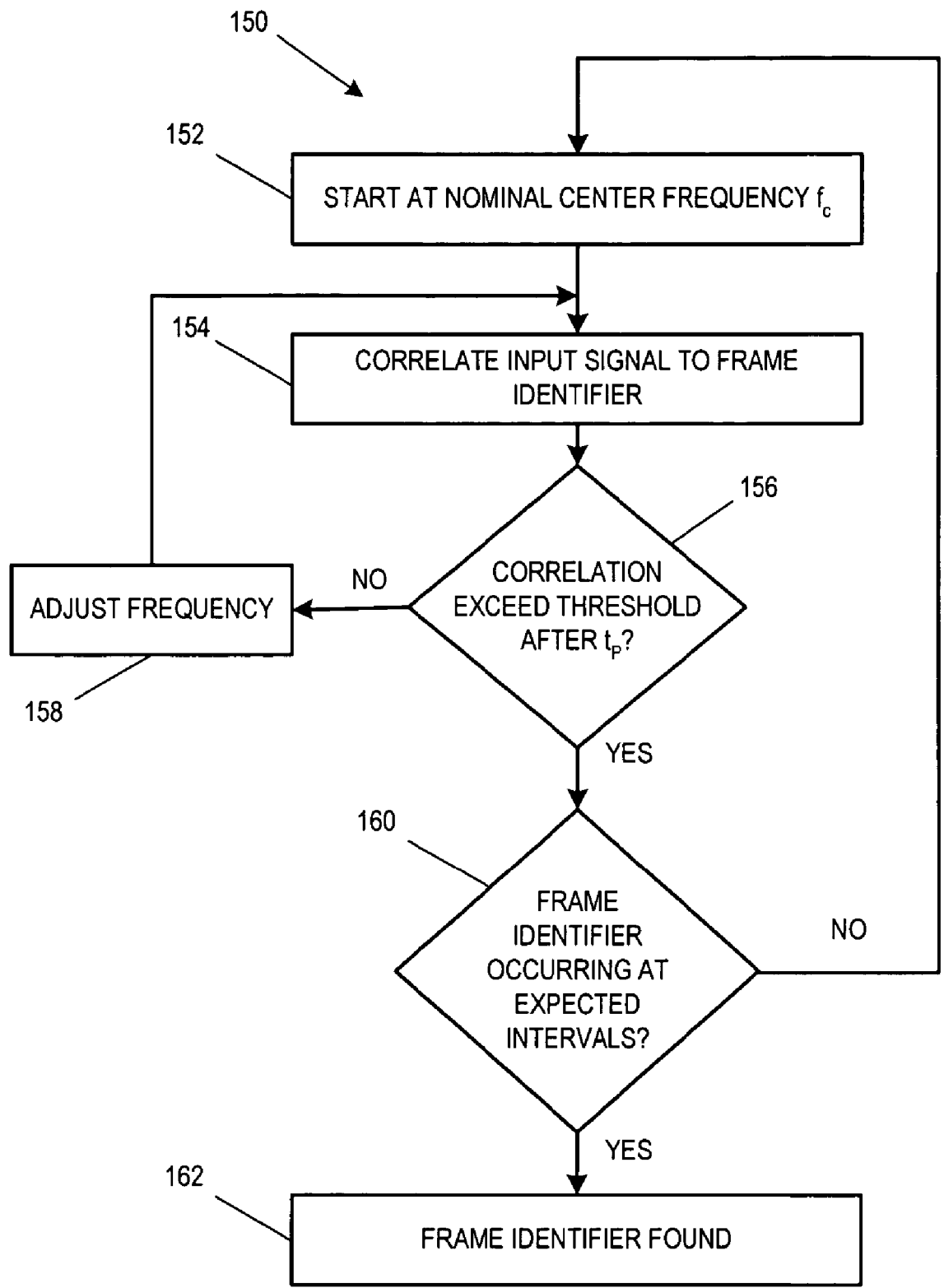
FIG. 5 is a flow diagram illustrating an example process for identifying a frame identifier.

FIG. 5 is a flow diagram illustrating an example process 150 for identifying a frame identifier. Step 152 starts at a nominal center frequency $f_c$. The center frequency $f_c$ may be selected in the same manner as in step 132 described above.

Step 154 correlates the input signal to one or more known frame identifiers. In an example embodiment for processing a DVB-S2 signal, a matched filter correlates the complex signal to two versions of the SOF frame identifier that are 90 degrees apart. The two outputs are individually squared and summed together.

Step 156 determines if the correlation exceeds a threshold after a time period $t_p$. In the example embodiment for processing a DVB-S2 signal, the period of time should be at least as long to allow the longest frame to be received, e.g., 33,282 symbols, to be certain that at least a header has passed through the matched filter. The summed value obtained in step 154 is compared with a predetermined threshold to decide if the SOF has been identified. The summed value may be used regardless of any phase error that exists over the 26 symbol SOF.

If after a set period of time the SOF is not found, the step 158 adjusts the center frequency $f_c$ and the process 150 returns to step 152. In the example embodiment for processing a DVB-S2 signal, the change in the center frequency is small enough to ensure that the change will not miss the SOF if the true frequency is between the initial frequency and the new frequency. Because the SOF is 26 symbols, a frequency change that corresponds to no more than one cycle of rotation across the 26 symbol SOF may be used. This change corresponds to a frequency change that is no more than 1/26th the symbol rate in Hz. In an alternate embodiment described with respect to FIG. 6, a random frequency hopping selection routine is used. Other dithering or frequency search techniques may also be used.

Step 160 determines whether the frame identifier occurs at expected intervals. Because the remainder of the header has not yet been decoded, the expected arrival time of the next frame may not be known. However, in many VCM and ACM systems, the arrival times between frames are typically defined by a plurality of specified values. In the example embodiment for processing a DVB-S2 signal, the spacing between headers (and thus between SOF data) may only be one of sixteen values. Once a possible SOF is identified, the matched filter outputs only at each of these sixteen possible subsequent locations. If another SOF is not found (e.g., the SOF matched filter output does not exceed the predetermined threshold), the first "find" may be in error and a new search begins by returning to step 152. Other decision methods to determine the presence or absence of the SOF may also be used.

Figure 6:
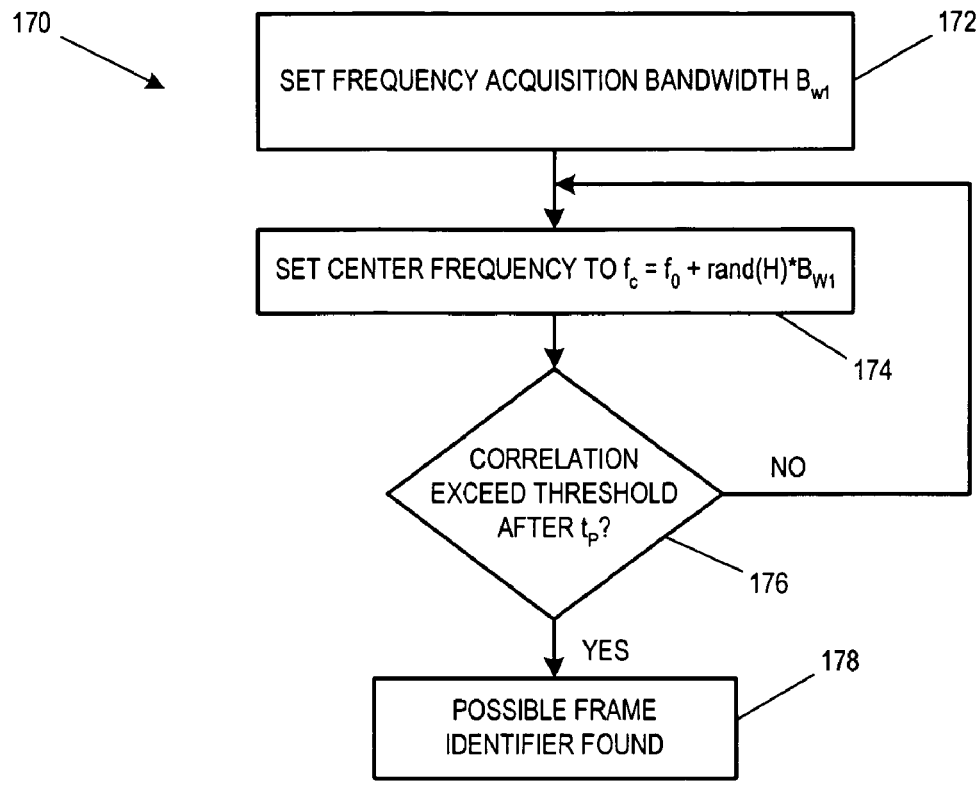
FIG. 6 is a flow diagram illustrating an example process for adjusting a center frequency during the process of FIG. 5.

FIG. 6 is a flow diagram illustrating an example process 170 for adjusting a center frequency that may be used in the process 150 of FIG. 5. The random frequency selection process 170 may be used instead of a conventional frequency sweep process to improve acquisition time.

Step 172 sets a frequency acquisition bandwidth $B_{w1}$, which is the bandwidth over which the center frequency $f_c$ may be adjusted, i.e., $f_0 \leq f_c \leq f_0 + B_{w1}$. Step 174 sets the center frequency $f_c$ to a random value defined by the equation:

$$f_c = f_0 + \text{rand}(H) * B_{w1}$$

where rand(H) is random number having a normal distribution between 0 and 1. Other random distributions may also be used. The output set of rand(H) should comprise enough discrete values to ensure that the resulting bandwidth spacing between all possible values of $f_c$ is within the pull-in range of the particular control process implemented. The bandwidth spacing may be defined by the symbol rate, e.g., 1/26th the symbol rate in Hz in a DVB-S2 embodiment, or by the maximum bandwidth over which a particular control loop implementation may maintain a system lock.

Step 176 determines if the correlation exceeds a threshold after a time period $t_p$. Step 176 may correspond to step 156 in the process 150 of FIG. 5. If the correlation does not exceed a threshold after the time period $t_p$, then the process returns to step 174 and another center frequency is selected. If, on the other hand, the correlation does exceed a threshold after the time period $t_p$, then step 178 signals that a possible frame identifier is found.

Figure 7:
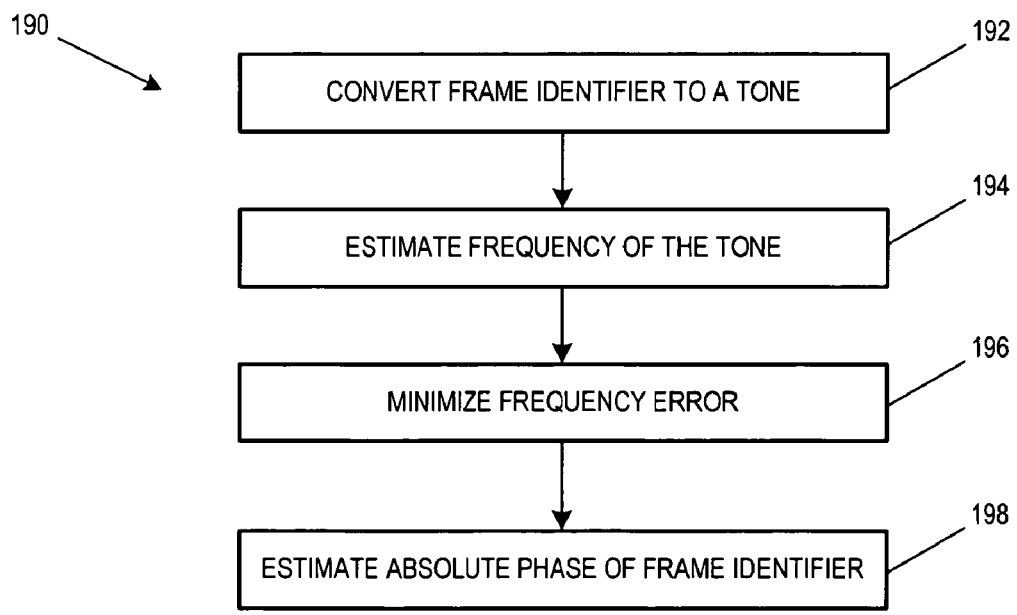
FIG. 7 is a flow diagram illustrating an example process for minimizing a frequency error and determining a phase based on the frame identifier.

FIG. 7 is a flow diagram illustrating an example process 190 for minimizing a frequency error and determining a phase based on the frame identifier. The process 190 of FIG. 7 may be implemented to further refine the coarse frequency estimate obtained by the process 150 of FIG. 5. In the example DVB-S2 embodiment, the process 150 of FIG. 5 may provide a center frequency $f_c$ in which the frequency error is relatively small (otherwise the threshold on the matched filter output would not have been exceeded). There can, however, still be a frequency error corresponding to significant fraction of a cycle across the 26 symbols. Thus, the process 190 of FIG. 6 provides added robustness by minimizing the frequency error and determining a phase based on the frame identifier.

Before the frequency or phase is estimated, the frame identifier modulation is removed by converting the received symbol sequence to a tone. Step 192 thus converts the frame identifier to a tone. In the example DVB-S2 embodiment, the SOF is transmitted via a BPSK modulation format and is converted to a tone. For symbols of the SOF where the SOF is a "1", the symbol is inverted by replacing the in-phase and quadrature values with the negative of the received values. For symbols of the SOF where the SOF is a "0", the in-phase and quadrature values are not modified. The resulting 26-symbol output is now a constant and thus appears as a sine wave in the in-phase and quadrature values. If there is no frequency error, the frequency deviation of this sine wave is zero, and the in-phase and quadrature values are relatively constant and are affected only by noise.

Step 194 estimates the frequency error of the tone. The frequency error of the tone may be determined by one of several methods, e.g., complex Fast Fourier Transforms, interpolation, or sine and cosine correlators. The estimated frequency error may be used to shift the input signal to drive the error to zero using a control loop. In one embodiment, a "high frequency low frequency" energy difference may be used to determine the frequency error of the tone, and is described with respect to FIG. 8, which depicts an example frequency error estimator 200. A digital down converter 201 receives a processed signal and outputs a sequence of symbols to a processing block 202 that generates a frame identifier tone. The frame identifier tone is input into processing block 204, which, in turn, rotates the frame identifier symbols at a frequency of +f and −f. The magnitude of f should be normalized with respect to the symbol rate. In the example DVB-S2 embodiment, for example, the magnitude of f may be equal to ½*(360/26) degrees per symbol. Other values may also be used. Additionally, a "no rotation" or 0 Hz sum may be used to compute the carrier phase angle at the time of the SOF.

The processing block 206 sums the in-phase and quadrature components of the rotated frame identifier symbols. The summed in-phase and quadrature values for the rotated frame identifier symbols at the frequency of +f and −f are provided to the processing block 208, which determines the energy values associated with the rotated frame identifier symbols.

Step 196 minimizes the frequency error. In the example frequency error estimator 200 of FIG. 8, the processing block 212 determines an error based on the energy values associated with the rotated frame identifier symbols, and drives a PI controller 214 that provides feedback control to the digital down converter 201 for control of the center frequency $f_c$. Once the error is minimized, the processing block 216 outputs a phase angle based on the frame identifier symbols.

In an alternate embodiment, the digital down converter 201 may be replaced by a fractional-N synthesizer. Other input processing devices may also be used.

In yet another alternate embodiment, the frequency error may be minimized by interpolating between the +f, 0, and −f rotated symbols. A polynomial curve fit may be used to identify a maxima. Other numerical methods may also be used.

In operation, the frequency error estimator 200 makes changes to the input frequency and after many frames (or SOFs) and settles on a frequency error that is minimized. In the example DVB-S2 embodiment, because the SOF value is known, and because the remainder of the header has yet to be decoded, only the 16 possible arrival locations are monitored for the next header. In an alternate embodiment, the frequency estimate may be used to remove the frequency error on each SOF and the subsequent 64 symbols of the remainder of the header. The arrival time of the next frame can then be determined. This eliminates the settling time associated with the frequency control loop and a faster acquisition is achieved.

Step 198 estimates the absolute phase of the frame identifier. In the example DVB-S2 embodiment, the phase of the SOF is computed from the in-phase and quadrature values by a look-up table, an archtangent (Q/I), Cordic, or by any other appropriate phase function. The resulting phase estimate is thereafter utilized as an absolute phase reference.

Figure 9:
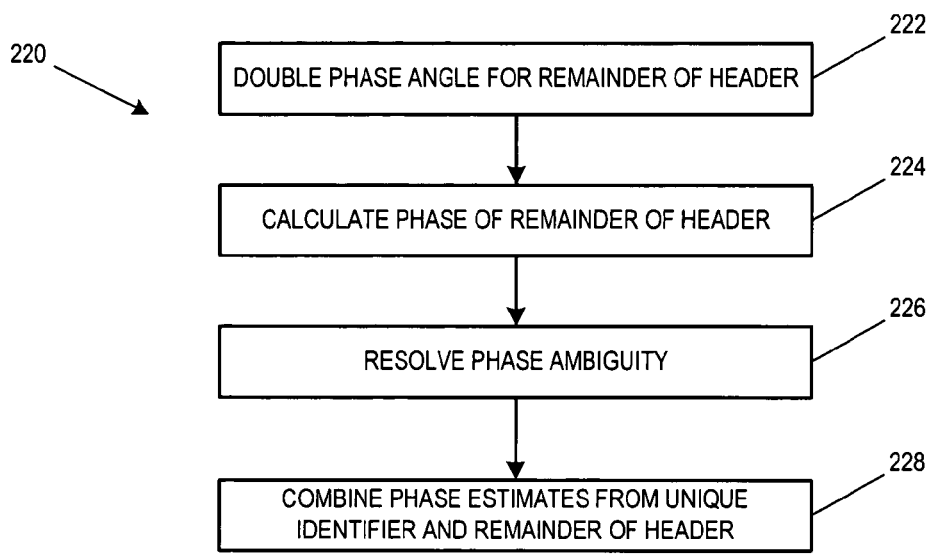
FIG. 9 is a flow diagram illustrating an example process for updating the phase estimate based on the remainder of the header.

FIG. 9 is a flow diagram illustrating an example process 220 for updating the phase estimate based on the remainder of the header. The phase estimate may be further refined by using an estimated portion of the remainder of the header and then combining the estimates. The remainder of the header is estimated starting with the signal estimated in process 190. In the example DVB-S2 embodiment, the phase estimate of the first 26 symbols of the SOF of the 90-symbol header has been obtained. While this phase estimate could be used for the entire 90 symbol header, the estimate may be improved by using the remaining 64 symbols. Because these 64 symbols have not yet been decoded, the data is unknown. Thus the data is removed in a similar manner that the SOF was removed in process 190.

Because the modulation format of the remainder of the header is BPSK, the phase angle of each of these 64 symbols can be doubled. Thus step 222 doubles the phase angle of the remainder of the header. This resulting sequence of 64 symbols is effectively a constant that appears as a tone. The phase angle may be doubled by reference to a look-up table, or by rectangular to polar conversion, followed by a doubling multiplier and converting back to polar. Other algorithms may also be used.

Step 224 calculates the phase of the remainder of the header. In the example DVB-S2 embodiment, the in-phase and quadrature values are summed and the phase is estimated from these sums, resulting in an estimate of the phase angle over the last 64 symbols of the header. The resulting phase angle, however, is twice the phase angle of the carrier due to the phase doubling in step 222, and thus any frequency error results in this tone being at twice the carrier error frequency. Accordingly, the phase angle estimate is thus divided by two.

Step 226 resolves any phase ambiguity. The phase angle estimate from step 224 is an estimate of the carrier phase angle; however, the estimate has an inherent 180 degree phase ambiguity due to the doubling of the phase angle. In one embodiment, the phase ambiguity may be resolved by comparing the phase estimate resulting from step 224 to the phase estimate resulting from step 198. If these two phase angles differ by less than 90 degrees, there is no phase ambiguity. If, however, the two phase angles differ by more than 90 degrees, then the in-phase and quadrature values for the phase calculation in step 224 are inverted to resolve the phase ambiguity.

Step 228 then combines the phase estimates from the unique identifier and the remainder of the header to obtain an improved phase estimate for the entire header. In the example DVB-S2 embodiment, the combination is achieved by adding the in-phase and quadrature components of the phase estimates from steps 198 and 224 and computing the phase angle from these sums. Due to the doubling of the phase angle, or due to other non-linearities, the quality of the phase estimate may be slightly compromised if the in-phase and quadrature components are directly summed. Thus, in one embodiment, the in-phase and quadrature components are a weighted sum. This weighting may be a function of the SNR, reducing the magnitude of the in-phase and quadrature components for the remainder of the header with decreasing SNR. For example, for BPSK at an SNR range of −2.5 dB to +3.0 dB, the weighting may range from 0.7 to 1.0. Other weighting factors may also be used. In one embodiment, the optimal weighting comprises weighting coefficients that minimize the mean squared error.

Figure 10:
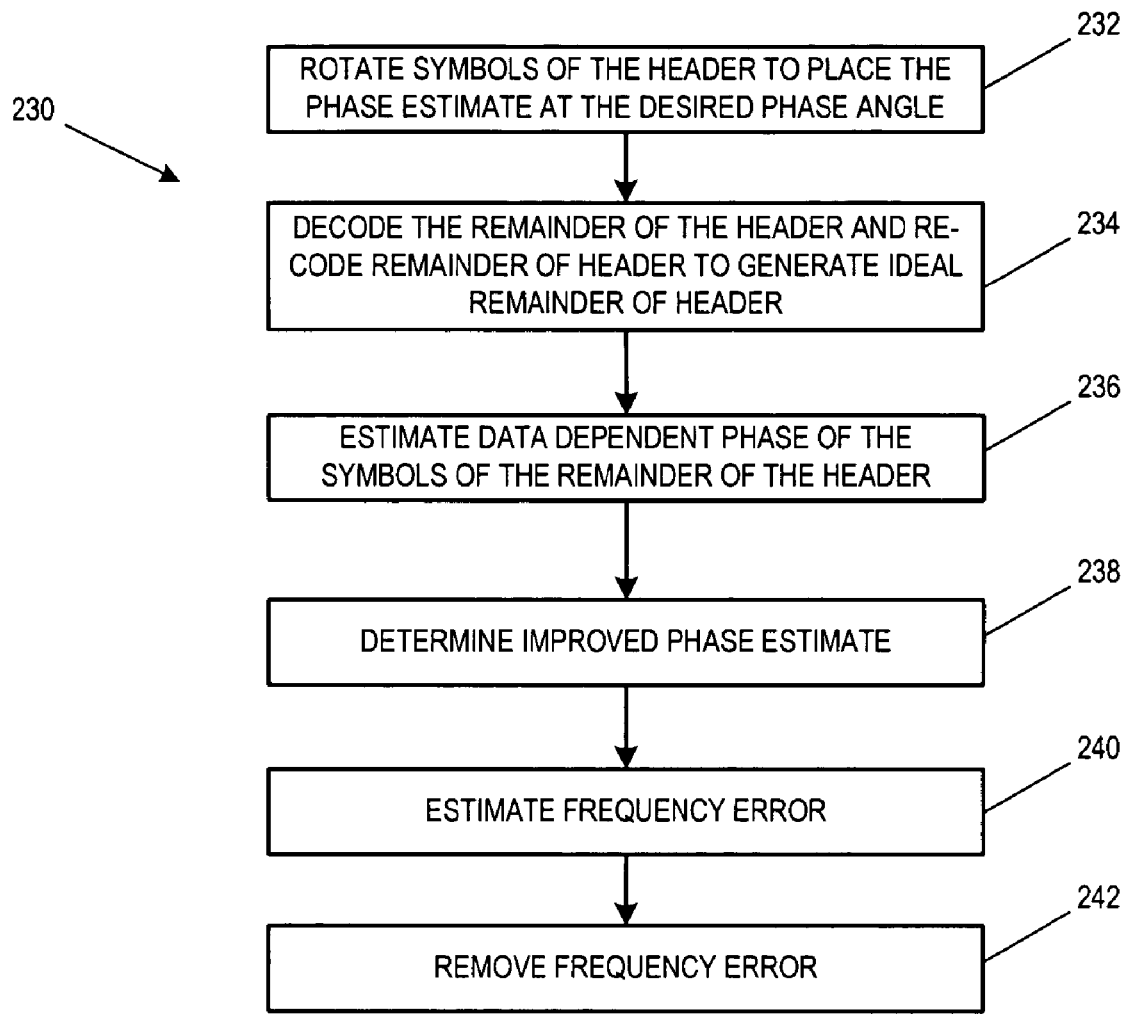
FIG. 10 is a flow diagram illustrating an example process for further updating the phase estimate and the frequency estimate based on a decoded version of the remaining header information.

FIG. 10 is a flow diagram illustrating an example process 230 for further updating the phase estimate and the frequency estimate based on a decoded version of the remaining header information. In general, the phase and frequency estimates may be further refined by using a decoded version of the remainder of the header.

The decoded version of the header is estimated beginning with the phase signal estimated in step 228. Step 232 rotates the symbols of the header to place the phase estimate at a desired phase angle. In the example DVB-S2 embodiment, each of the 90 symbols of the header are rotated to place the phase estimate at a desired phase angle, e.g., 0 degrees. The rotation is based on the difference between the desired phase angle and the phase estimate of the SOF. Thereafter, step 234 decodes the remainder of the header and re-codes and re-modulates the resulting information to generate an ideal remainder of the header. In the example DVB-S2 embodiment, the 64 symbols of the signaling portion of the header are decoded and re-coded and re-modulated. The decoded header provides information for subsequent operations, including the modulation used, the coding used, the block size, and the presence and absence of pilot symbols. From this information the number of symbols in the frame and the number of symbols until the next header is readily ascertained.

Step 236 estimates the data dependent phase of the remainder of the header. The re-encoded remainder of the header provides the actual transmitted symbol sequence of the latter symbols of the header. Thus, a doubling of the phase angle is not required and a phase ambiguity is not introduced. In the example DVB-S2 embodiment, the 64 symbols of the received PLSCODE are converted to a tone in a process similar to the process of step 192 and based on the re-encoded and re-modulated PLSCODE. Thus, for symbols where the re-encoded PLSCODE sequence is a 1, the received PLSCODE in-phase and quadrature components are inverted. For symbols where the re-encoded sequence is a 0, the received PLSCODE in-phase and quadrature components are unaffected. The resulting 64 symbol output is now effectively a constant and resembles a sine wave in the in-phase and quadrature domain.

Step 238 determines an improved phase estimate. The phase estimate obtained in step 198 is combined with the phase estimate obtained in step 236. The combination of the phase estimates may be implemented by a process similar to the process of step 228.

Step 240 then estimates the frequency error. In one embodiment, the entire header is utilized to estimate the frequency error. The frequency error may be obtained by a process similar to the process of step 194. In the example DVB-S2 embodiment, the longer duration associated with all 90 symbols (as compared to the initial 26 symbols for the SOF only) results in a better estimate of the carrier frequency error.

Figure 8:
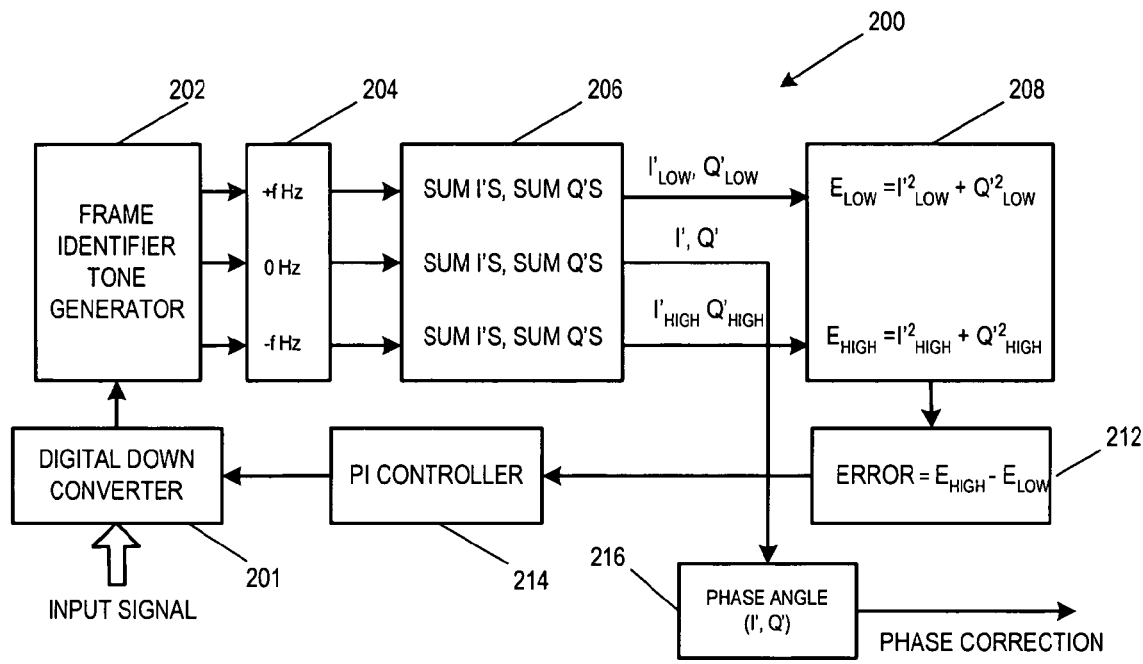
FIG. 8 is an example frequency error estimator.

The frequency error estimator 200 of FIG. 8 may also be used to estimate the frequency error from the entire header. The magnitude of the rotation frequency f should be limited to ½(360/90) degrees per symbol or less. Additionally, the 0 Hz sums may be used to estimate the phase of the entire header.

Step 242 minimizes the frequency error. The frequency error may be minimized by a process similar to the process of step 196. In the example DVB-S2 embodiment, a PID control loop is utilized to frequency shift the signal and drive the frequency error to zero. Initially the 26-symbol based frequency error estimate is used. When the average error approaches zero, the header can be decoded and the resulting 90 symbol version of the header may be used as input to the frequency error estimator 200.

FIGS. 4-10 above describe a header-based coarse frequency recovery and frame recovery system and method. The systems and methods of FIGS. 4-10 utilize only the headers and result in carrier frequency synchronization to the point where the carrier frequency error is kept small via the control loop and frame synchronization. Additionally, the systems and methods of FIGS. 4-10 provide a decoded header that indicates the arrival of the next header as well as the modulation format of the frame.

Thereafter, phase and frequency information may be corrected using an adaptive frame-by-frame process. In general, the carrier phase information extracted from the previous frame may not be reliable and may not be suitable for the present frame. For example, in a DVB-S2 system, a first user, user A, may have a relatively high SNR link of 10.0 dB and a second user, user B, may have a relatively low SNR link of 3.0 dB. Although the same waveform is transmitted to both users, user B may suffer from different conditions such as heavy rain, while user A may be at a different location with a clear sky. When sending data to user A, it is desirable to use as high a modcode as possible for the data, e.g., an 8-PSK modulation format and a rate 0.8 code. When sending data to user B, it is also desirable to use as high a modcode as possible for the data. In the case of user B, however, an appropriate modcode may be a QPSK modulation format and a rate 0.5 code. Assuming that traffic is limited to users A and B, if the modem for user B attempts to continuously track the carrier phase, then user B's modem will attempt to track the phase in all frames, including those frames that do not carry traffic for user B. These other frames are modulated per the channel quality of user A, and thus the modem of user B will be unable to extract any useful carrier phase information from the frames intended for user A.

Figure 11:
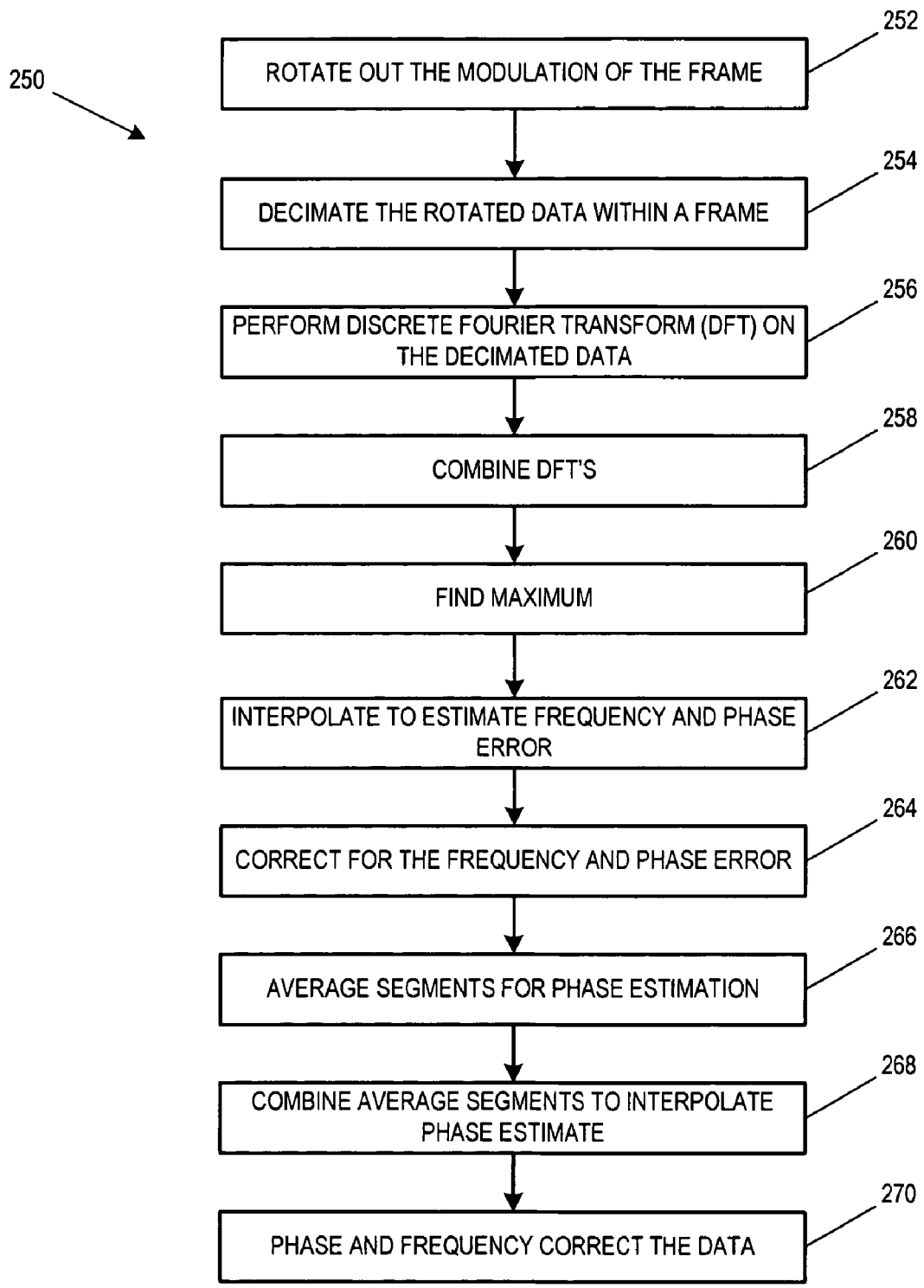
FIG. 11 is a flow diagram illustrating an example process for adaptive frame-by-frame phase and frequency synchronization.

Accordingly, the carrier phase is estimated across individual frames independently. FIG. 11 is a flow diagram illustrating an example process 250 for adaptive frame-by-frame phase and frequency synchronization. In general, the process of FIG. 11 performs a carrier frequency and phase recovery using an adaptive data-based first-order frequency estimate with an initial phase estimate. The first step of the data-based carrier recovery is a first-order frequency estimate with an initial phase estimate. Linear phase estimates are generated that minimize the mean squared phase error.

Figure 12:
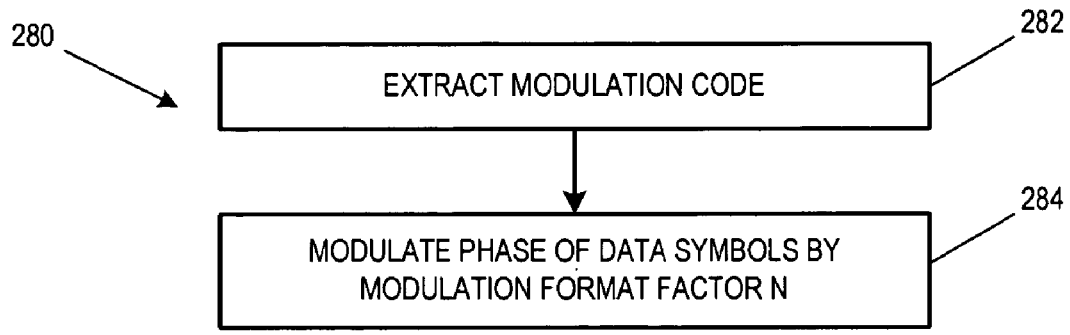
FIG. 12 is a flow diagram illustrating an example process for rotating out a modulation code.

Step 252 rotates out the modulation of the frame. FIG. 12 is a flow diagram illustrating an example process 280 for rotating out a modulation code. Step 282 extracts the modulation code. In the example DVB-S2 embodiment, extraction of the modulation code provides information regarding the modulation format of the frame and the presence or absence of pilot symbols. For non-pilot symbols (i.e., data symbols), the modulation is removed by multiplying the phase angle of these symbols by a factor associated with modulation format. For each data symbol pair in the frame, the phase angle is calculated. Step 284 then multiples the phase of the data symbols by a modulation format factor N to generate an in-phase and quadrature pair with the same radius as the original in-phase and quadrature pair but at a phase angle at N times the original phase angle. Thus for a modulation format of QPSK, N=4; for a modulation format of 8-PSK, N=8; and for a modulation format of 16-ASK, N=12. Other modulation format factors N for other modulation formats that generate an in-phase and quadrature pair with the same radius as the original in-phase and quadrature pair may also be used. Step 232 thus removes the modulation by an "N-theta" operation resulting in a constant phase ("tone") at a frequency that is N times the residual carrier error frequency.

After the modulation has been rotated out by step 252, step 254 decimates the rotated data within a frame. To perform carrier phase tracking, the residual carrier frequency error should be small so the rate of change of the instantaneous phase is likewise small and does not change significantly from symbol to symbol. This facilitates averaging over many symbols with little phase variation over the averaging window size. This typically does not occur over the entire frame but rather over a smaller window size.

In the example DVB-S2 embodiment, averaging a window of 18 symbols ensures that the symbols are relatively constant over this window. Additionally, an 18-symbol block is a common factor in the DVB-S2 waveform. Regardless of what modulation and coding is used and whether there are pilots, the DVB-S2 waveform does not change the symbol type within these blocks of 18 symbols. The header comprises five blocks of 18 symbols for a total of 90 symbols, and the data section is made up of blocks of 90 symbols. If pilot symbols are present they are placed between the data blocks of 90 symbols and comprise 36 contiguous symbols. Thus the knowledge of the header location likewise provides the location of the boundaries, of the 18-symbol blocks. Accordingly, the in-phase and quadrature components may be summed across these 18-symbol blocks to decimate to 1/18th the symbol rate to ease subsequent processing requirements.

After decimation, step 256 performs discrete Fourier transforms on the decimated data. The discrete Fourier transform data facilitates tolerance of relatively large frequency errors over the frame. The transform operation may be performed by a bank of complex down-converters and correlators. Other implementations may also be used, however. In the example DVB-S2 embodiment, the frequency spacing between the down-converters is chosen to facilitate subsequent processing. The frequency spacing is selected so as not to exceed the orthogonal spacing $f_{space}=1/n$, where n is the number of symbols in the window. In one embodiment, the frequency spacing $f_{space}$ is ½n. Note that in this example embodiment, this spectrum is defined with respect to the "N theta" frequency error operation of step 284.

Figure 13:
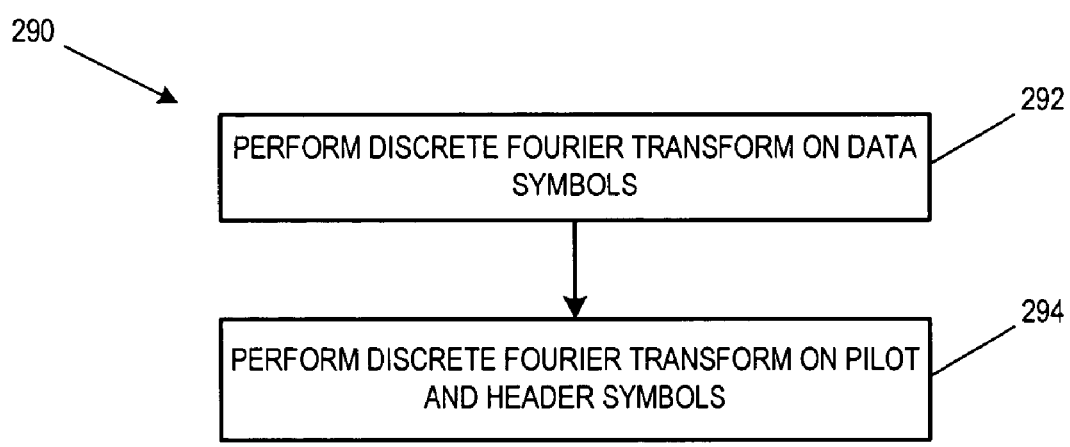
FIG. 13 is a flow diagram illustrating an example process for determining frequencies of data symbols and pilot and header symbols.

In one embodiment, the frequencies of the data symbols and pilot symbols are determined separately. FIG. 13 is a flow diagram illustrating an example process 290 for determining frequencies of data symbols and pilot and header symbols.

Step 292 performs discrete Fourier transforms on the data symbols, and step 294 performs discrete Fourier transforms on the pilot symbols.

In the example DVB-S2 embodiment, the input to the correlators for pilot symbols can be removed by replacing the pilot symbols with 0 as the pilot symbols do not undergo an N-theta operation in step 284. The frequency between the correlation frequencies may be estimated by interpolation, and thus a frequency spacing that is half the orthogonal spacing is used. In one embodiment, 33 correlator banks (16 positive frequencies, 16 negative frequencies and the 0 Hz frequency) are used. For QPSK modulation, a spectrum in the range of +/−2 cycles per frame of the underlying residual carrier may be used. For 8-PSK modulation, a spectrum in the range of +/−1 cycle per frame of the underlying residual carrier may be used.

For the headers and pilot symbols, another bank of 33 complex down converters and correlators may be used at a spacing of 1/(2 Nn) cycles per frame. This configuration provides an output in which each correlator corresponds to the same residual carrier frequency of each bank in the N-theta data correlation bank values.

The accumulators are reset to zero at the beginning of a frame. The values in the accumulators are stored at predetermined intervals throughout the frame. For example, if the predetermined interval is 8, then 1056 total values are stored (33 frequency correlators*2 symbol types (pilot or data)*2 values per symbol (in-phase and quadrature)*8). Other predetermined intervals may also be used. In one embodiment, the down-converters are shared between pilot and data symbols, and thus only the accumulators need to be updated accordingly.

After step 256 is executed, step 258 combines the discrete Fourier transforms. In the example DVB-S2 embodiment, each of the 33 correlation values for the data symbols provides information about the residual carrier error from the data portion of the received frame. Likewise, each of the 33 correlation values for the pilot and header symbols provides information about the residual carrier error from the pilot and header portion of the received frame.

Figure 14A:
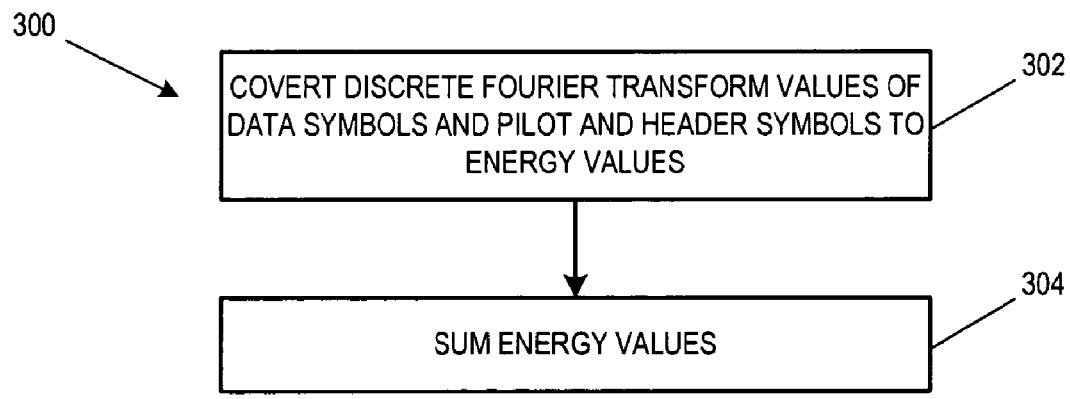
FIG. 14A is a flow diagram illustrating an example process for combining discrete Fourier transform data of the data symbols and the pilot and header symbols.
Figure 14B:
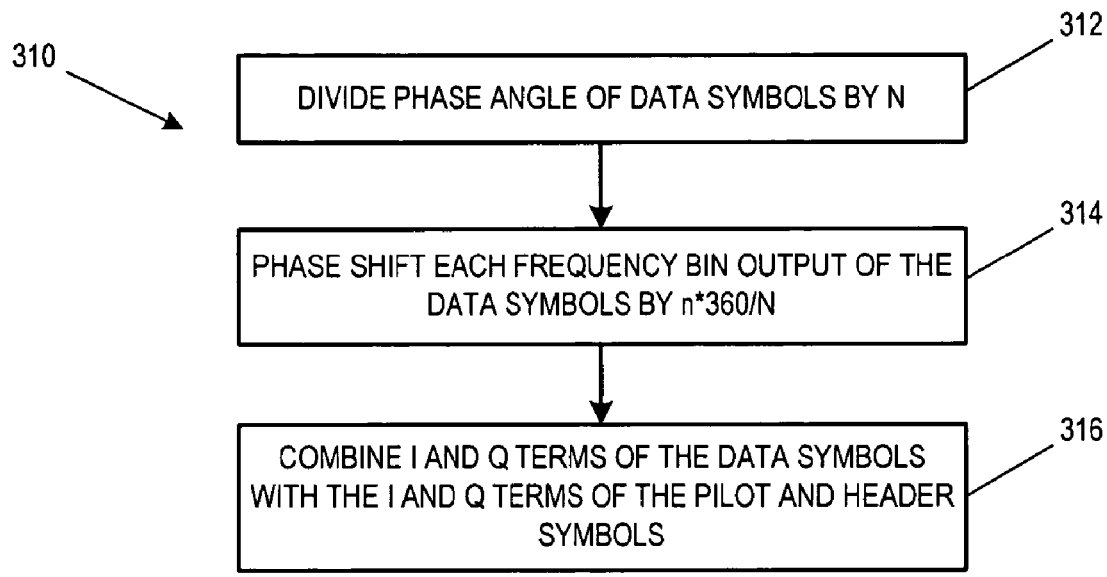
FIG. 14B is a flow diagram illustrating another example process for combining discrete Fourier transform data of the data symbols and the pilot and header symbols.

FIGS. 14A and 14B provide flow diagrams illustrating example process 300 and 310 for combining discrete Fourier transform data of the data symbols and the pilot and header symbols. Other combining processes may also be used, such as a combination of processes 300 and 310, for example.

In the first alternate process 300, step 302 converts discrete Fourier transform values of data symbols and pilot and header symbols to energy values. For example, the values of each discrete Fourier transform may be converted to energy values using $E(f)=I^2(f)+Q^2(f)$. Step 304 then sums the energy values so that the total energy $E_{total}(f)=E_{NthedaData}(f) \, E_{pilot}(f)$.

In one embodiment, the total is a weighted sum comprising weight coefficients that minimize the mean squared error. The weight coefficients may be generated adaptively or empirically. For example, a known frame can be generated and noise added to each symbol in the frame at a noise level approaching the FEC operating point. The discrete Fourier transform is processed with the weight coefficients to generate a frequency and initial phase estimate. The estimates are converted into a phase estimate per symbol throughout the frame and compared with the actual phase per symbol. The weighting coefficients are adjusted until the mean squared error is minimized.

In the second alternate process 310, step 312 divides the phase angles of the data symbols by the modulation format factor N. Step 314 then phase shifts each frequency bin output of the data by (360/N) multiplied by an integer multiple n to align the data and pilot terms. The process may be performed repeatedly for multiple values of the integer multiple n, e.g., n=0, 1, 2 . . . m, until the integer multiple n that achieves a maximum correlation between the data output vector and the pilot output vector is selected. Step 316 then combines the in-phase and quadrature components of the data symbols with the in-phase and quadrature components of the pilot and header symbols for each of the 33 frequency terms. A weighted sum similar to the weighted sum of step 304 may be used.

After the discrete Fourier transforms are combined, step 260 finds the maximum frequency among the discrete Fourier transform bins. Step 262 then interpolates among the discrete Fourier transform bins to find the frequency error. In the example DVB-S2 embodiment, given that the frequencies are spaced at half the orthogonal spacing, the peak interpolated value can be accurately approximated with a second order polynomial curve fit using the frequency of the maximum and the two adjacent frequencies.

The phase of the frequency may also be determined after the peak frequency is interpolated. In one embodiment, the phase is estimated by using the phase of the maximum frequency term, and linearly interpolating with the phase of the nearest adjacent frequency. Other interpolation methods may also be used.

The resulting frequency and phase data from step 262 could be used to correct the phase and frequency across the frame. The data from step 262 results in a minimum mean squared error frequency and phase estimation and correction across the frame. Further refinement, however, may be obtained by generating multiple estimates of the phase over the frame. Accordingly, step 264 corrects for the frequency error based on the frequency value found in step 260.

Figure 15:
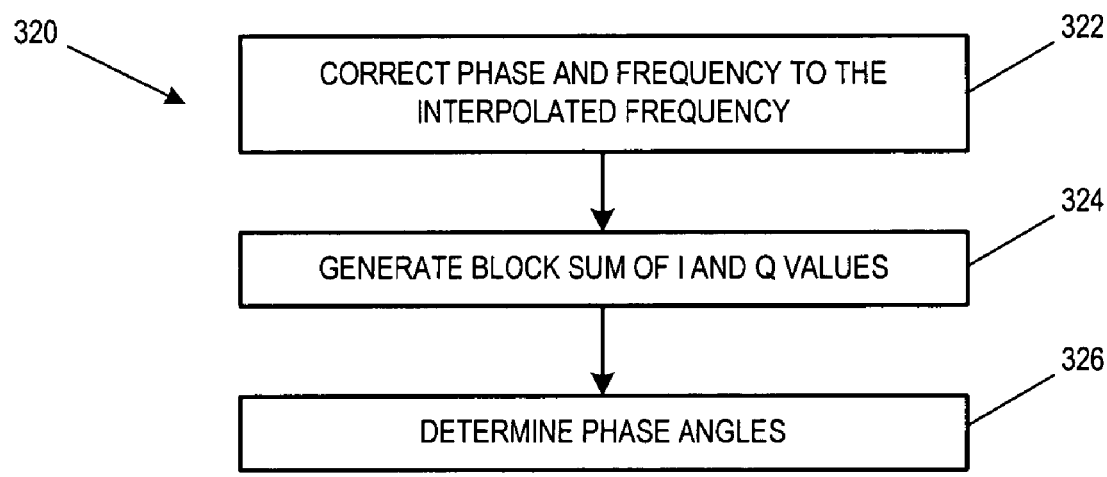
FIG. 15 is a flow diagram illustrating an example process for correcting a frequency error based on the combination of discrete Fourier transform data from either FIG. 14A or 14B.

One example implementation of step 264 is shown in FIG. 15, which is a flow diagram illustrating an example process 320 for correcting a frequency error based on the combination of discrete Fourier transform data from either FIG. 14A or 14B. Step 322 corrects the phase and frequency to the interpolated frequency. In the example DVB-S2 embodiment, the frequency band having the maximum frequency value and its eight instants of recorded values (both data symbols and pilot and header symbols) are phase and frequency corrected to match the interpolated frequency and phase terms found in step 262. Step 324 then generates block sums of the in-phase and quadrature values, and step 326 determines the phase angles. In the example DVB-S2 embodiment, the phase estimates are generated throughout the frame by using the stored accumulated values. Taking the difference between the accumulator values produces a block sum (average) of the in-phase and quadrature values between those instances, from which the phase estimates may be calculated.

Step 266 then averages the phase segments from step 264. In the example DVB-S2 embodiment, the segment averages are the average phase of the signal between the time instances of the predetermined stored accumulator values and are generated for both data symbols and pilot and header symbols. The averages may be block averages, overlapping block averages, or other types of averages.

Step 268 then combines average segments to interpolate a phase estimate. In the example DVB-S2 embodiment, the phase angle of the data symbols are divided by N and rotated by an integer multiple of (360/N) to align with the pilot and header symbols. The result is a series of phase estimates that may be linearly interpolated to generate an estimate of the phase throughout the frame, i.e., a phase estimate of the phase as a function of the position in the frame. The series of phases throughout the frame should represent small deviations from a linear fit to the data generated in step 262. The deviation is typically limited to +/−360/2N. Should the true phase deviate beyond this range, the result appears as a cycle slip. The cyclic slip can be minimized by evaluating the change between phase estimates and adding or subtracting a phase multiple of 360/N to a particular phase estimate to minimize the rate of change. The actual number of phase estimates to be used may be based on the modulation and coding as well as the expected degree of phase noise.

Step 270 then phase and frequency corrects the data symbols over the frame. In the example DVB-S2 embodiment, the data symbols are corrected for the interpolated frequency of step 262 and the linearly interpolated phase estimates of step 268.

Figure 16:
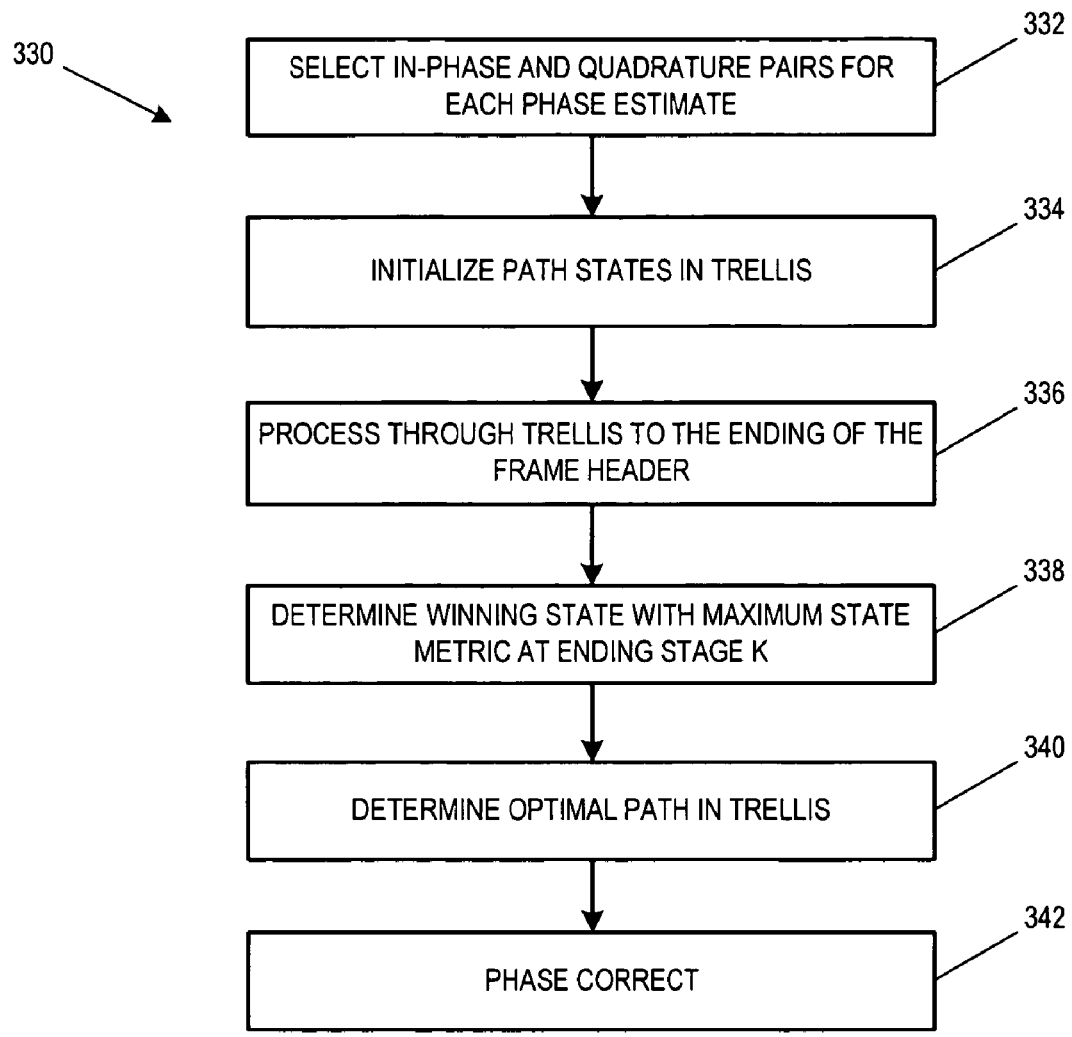
FIG. 16 is a flow diagram illustrating an example process for resolving phase ambiguity.

Two types of phase estimates are obtained using the methods described above, the first based on pilot and header symbols and the second based on data symbols. The phase estimates based on the data symbols have a potential phase ambiguity, as discussed above. Selecting the incorrect phase state results in cycle slips. Accordingly a Viterbi algorithm may be used optimally resolve phase ambiguity by identifying the most possible transition path along a sequence of phase estimates. FIG. 16 is a flow diagram illustrating an example process 330 utilizing a Viterbi algorithm for resolving phase ambiguity. FIG. 16 is described in the context of an example DVB-S2 embodiment; however, the process of FIG. 16 may be applied to other frame-based communication systems. The following notations are uses with reference to FIG. 16:

K: Number of intervals that discrete Fourier transform data has been stored per frame;

N: Ambiguity for a particular modulation scheme (4 for QPSK modulation, 8 for 8-PSK modulation, and 12 for 16-APSK modulation)

The inputs to the Viterbi estimator are:

$(I_p, Q_p)_k$: The PLheader or pilot in-phase and quadrature component at index k;

k=0: PLheader in-phase and quadrature component at the start of a frame;

k=K: PLheader in-phase and quadrature component at the end of a frame;

k=1 ~K−1: pilot in-phase and quadrature components along the frame.

$(I_d, Q_d)_{k,n}$: The data in-phase and quadrature components at stage k and corresponding to state n.

The outputs of the Viterbi estimator are:

$\theta_0 \sim \theta_K$: K+1 phase estimates along the frame with ambiguity optimally resolved.

In the example DVB-S2 embodiment, the data in-phase and quadrature components at each index k are converted back to 1-theta, and N sets of in-phase and quadrature components are obtained due to the ambiguity. When a pilot symbol is not used, $(I_p, Q_p)_k = (0, 0)$.

Step 332 selects an in-phase and quadrature pair for each phase estimate. Step 334 initializes path states in a trellis. In the example DVB-S2 embodiment, a trellis with N states $(S_0 \sim S_{N-1})$ and depth of K (stages 0 to K) is constructed. The optimal phase transition corresponds to a path, which is a sequence of selected states, along the trellis. The path metrics for states $S_0 \sim S_{N-1}$ at stage 0 are initialized equally as 0 due to the PLheader not having a phase ambiguity. $(I_p, Q_p)_0$ are assigned to states $S_0 \sim S_{N-1}$.

Figure 17:
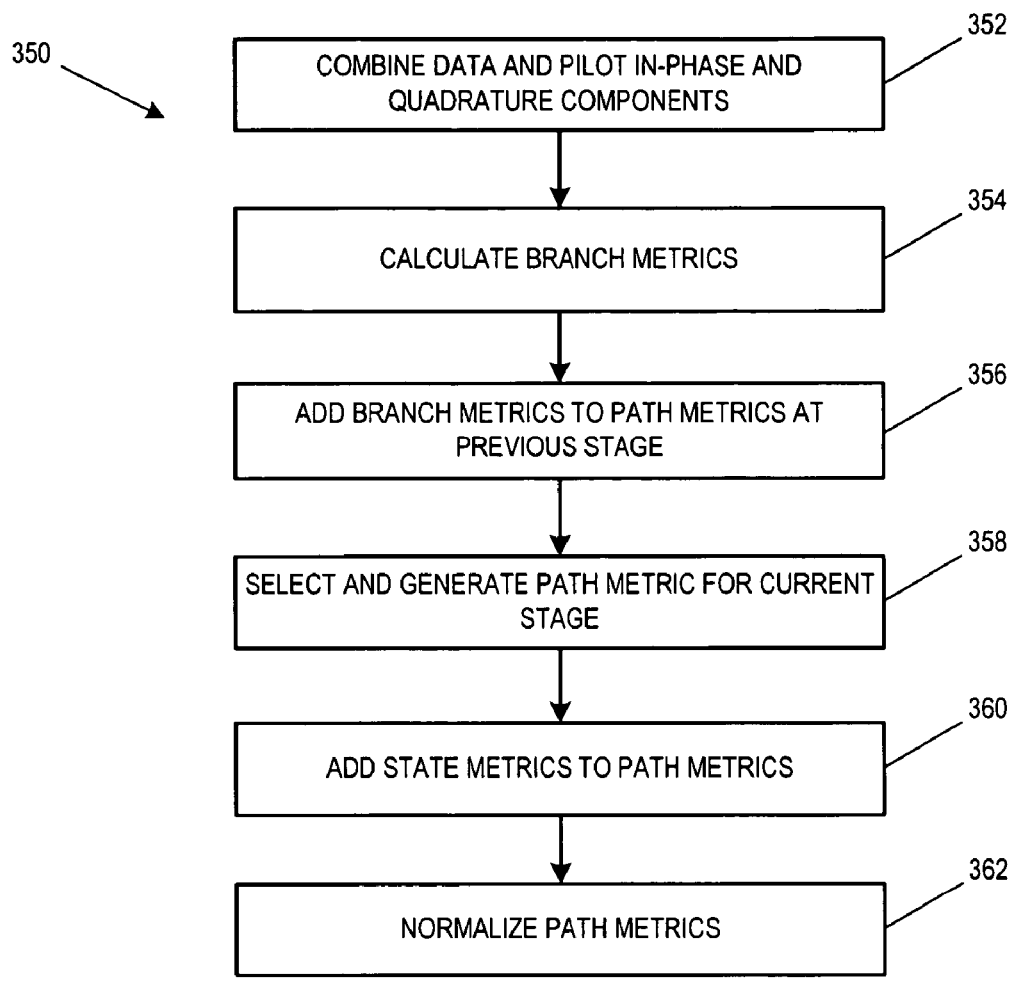
FIG. 17 is a flow diagram of an example process for processing a trellis.

Step 336 processes through the trellis to the ending of the frame header. FIG. 17 is a flow diagram of an example process 350 for processing a trellis in an example DVB-S2 embodiment. Step 352 combines the data and pilot in-phase and quadrature components. Thus at index k and state n $(I,Q)_{k,n} = (I_p, Q_p)_k + W \cdot (I_d, Q_d)_{k,n}$. W is a weighting factor that can be optimized for various channel conditions.

Step 354 calculates the branch metrics. At each state n, it is assumed that there are only three possible incoming branches. These three branches correspond to the phase transitions from state n−1, state n and state n+1 at stage k−1 to state n at stage k. This assumption simplifies add-compare-select operations through the trellis. Performance degradation is limited due to the phase change being generally slow and correlated. The branch metrics are calculated as the correlation between $(I,Q)_{k,n}$ and $(I,Q)_{k-1,j}$, where j is n−1, n, or n+1.

Step 356 adds the branch metrics to the path metrics at previous stage. At each state n, the branch metric calculated for the transition from state n−1 is added to the path metric of state n−1 as the first path metric candidate. The branch metric calculated for the transition from state n is added to the path metric of state n as the second path metric candidate. The branch metric calculated for the transition from state n+1 is added to the path metric of state n+1 as the third path metric candidate.

Step 358 selects and generates the path metric for current stage k. At each state n, select the maximum path metric from the three candidate path metrics as the current path metric. The winning previous state (n−1, n or n+1) at stage k−1 is recorded. For potential additional operations, the second winner of the previous states can also be recorded, as well as the delta between the winner path metric and second winner path metric.

Step 360 adds state metrics to path metrics. At each state n, the state metric is calculated as the correlation between $(I_p, Q_p)_k$ and $(I_d, Q_d)_{k,n}$. Among all N data based in-phase and quadrature components, a state n with highest correlation between $(I_d, Q_d)_{k,n}$ and $(I_p, Q_p)_k$ receives the maximum value added upon the path metric. This tends to ensure that the state n will be on the finally-selected winning path.

Step 362 normalizes the path metrics so the path metrics remain in a reasonable magnitude allowing convenient hardware implementation. One example normalization routine is identifying the maximum among all path metrics and subtract this amount from all the path metrics.

In the In the example DVB-S2 embodiment of FIG. 17, each of the steps 352, 354, 356, 358, 360 and 362 are performed at each stage.

Step 338 determines the winning state with a maxim state metric at the ending stage K. After the path metrics are calculated and accumulated through the trellis to the ending stage K, the state with maximum path metric is selected as the winning state.

Figure 18:
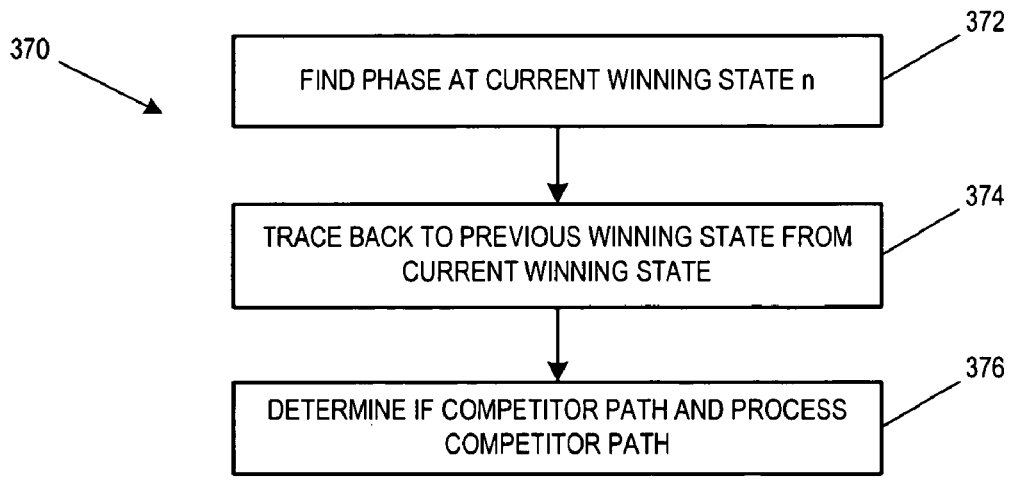
FIG. 18 is a flow diagram of an example process for determining an optimal path in the trellis.

Step 340 determines the optimal path in the trellis. FIG. 18 is a flow diagram of an example process 370 for determining an optimal path in the trellis.

Step 372 finds phase $\theta_k$ of the $(I,Q)_{k,n}$ at the current winning state n at stage k.

Step 374 traces back to previous winning state recorded for current winning state.

Step 376 examines the phase change between the winner path metric and second winner path metric and determines if it is below a threshold. If it is below a threshold, the previous winner state and previous second winner state are classified as close competitors. The stage may be flagged to preclude the $\theta_k$ calculated for that stage from being used in a final phase correction. Instead, a liner interpolation may be done directly between $\theta_{k-1}$ and $\theta_{k+1}$ for the final phase correction. When two previous states are competitors for the winning path, the winning path and the second winner path may be tracked separately until the two paths merge back to a single winner state solution.

In the example DVB-S2 embodiment, at each stage k (k=K−1 to 0), steps 372, 374 and 376 are performed.

Step 342 phase corrects the signal. The phase correction uses the output $\theta_0 \sim \theta_K$.

Figure 19:
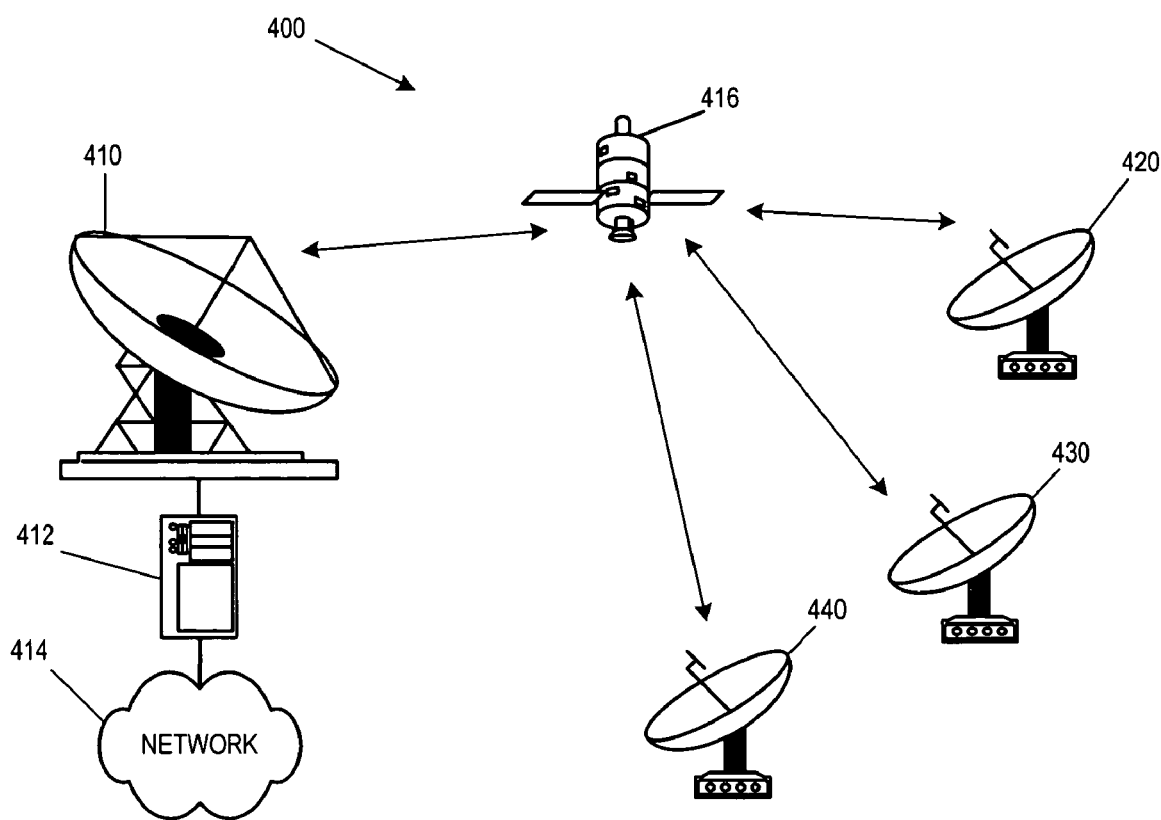
FIG. 19 is a block diagram of an example satellite communication system that may incorporate the novel systems and methods disclosed herein

FIG. 19 is a block diagram of an example satellite communication system that may incorporate the novel systems and methods disclosed herein. The system of FIG. 19 includes an uplink antenna 410 connected to a satellite hub station 412. The hub station 412 may comprise a network controller or other system control device hardware and software operable to monitor and/or control data communication parameters, and also includes a transmitter and receiver subsystem. The satellite hub station 412 in turn is connected to a network 414, such as the Internet or other data provider network. The hub station 412 communicates via a satellite 416 with a plurality of remote terminals 420, 430 and 440. Each remote terminal 420, 430 and 440 typically comprises a dish antenna and satellite modem.

The hub station 412 may generate a forward link time division multiplexed (TDM) signal that is received by the remote terminals 420, 430 and 440. The forward link signal may conform to a satellite communication standard that incorporates VCM or ACM, such as the DVB-S2 standard. All terminals 420, 430 and 440 may communicate back to the hub station 412 using one or more burst multi-frequency, time division multiple access (MF-TDMA) return link channels, or by other physical layer formats.

The terminals 420, 430 and 440 may comprise hardware and/or software realizing the novel coarse frequency and frame recovery and adaptive phase and frequency synchronization systems and methods disclosed herein. For example, the terminals 420, 430 and 440 may comprise one or more application specific integrated circuits (ASICS) that realize the coarse frequency and frame recovery and adaptive phase and frequency synchronization systems and methods disclosed herein. Other implementations in lieu of or in addition to ASICS may also be used.

The steps and the order of the steps in the methods and flowcharts described herein may be altered, modified and/or augmented and still achieve the desired outcome. Additionally, the methods, flow diagrams and structure block diagrams described herein may be implemented in the example processing devices described herein by program code comprising program instructions that are executable by the device processing subsystem. Other machine implementations may also be used, however, such as firmware or even appropriately designed hardware configured to carry out the methods and flow diagrams or implement the structure block diagrams described herein. Additionally, the methods, flow diagrams and structure block diagrams that describe particular methods and/or corresponding acts in support of steps and corresponding functions in support of disclosed software structures may also be implemented in software stored in a computer readable medium and equivalents thereof. The software structures may comprise source code, object code, machine code, or any other persistently or temporarily stored code that is operable to cause one or more processing systems to perform the methods described herein or realize the structures described herein.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method of wireless signal recovery, the method comprising:
   receiving a digitized signal representative of a received wireless signal;
   identifying a frame identifier in a physical layer header of the digitized signal;
   utilizing the identified frame identifier to estimate a first phase associated with the frame identifier;
   utilizing a remaining portion of the physical layer header to estimate a second phase associated with the remaining portion, wherein estimating the second phase is based on doubling a phase angle associated with the remaining portion and comprises:
     doubling the phase angle associated with the remaining portion;
     calculating the second phase estimate for the remaining portion by summing a plurality of in-phase and quadrature values and dividing the summation by two; and
     resolving a phase ambiguity in the second phase estimate by comparing the second phase estimate to the first phase estimate; and
   combining the first phase estimate and the second phase estimate to generate a first combined phase estimate.

2. The method of claim 1, further comprising:
   decoding the remaining portion utilizing the first phase estimate.

3. The method of claim 2, further comprising:
   utilizing the decoded remaining portion to estimate a third phase.

4. The method of claim 2, further comprising:
   utilizing the decoded remaining portion to estimate a third phase associated with the remaining portion; and
   combining the first phase estimate and the third phase estimate to generate a second combined phase estimate.

5. The method of claim 2, wherein the decoding the remaining portion utilizing the first phase estimate comprises:
   decoding the remaining portion utilizing the first combined phase estimate.

6. The method of claim 1, wherein utilizing the remaining portion of the physical layer header to estimate the second phase associated with the remaining portion comprises:
   utilizing a decoded version of the remaining portion of the physical layer header to estimate the second phase for the remaining portion.

7. The method of claim 1, further comprising:
   identifying a plurality of additional frame identifiers in the digitized signal;
   estimating a phase for each of at least a subset of the additional frame identifiers; and
   utilizing the phase estimates associated with the additional frame identifiers to adaptively adjust the first combined phase estimate.

8. The method of claim 1, further comprising:
   utilizing the identified frame identifier to estimate a frequency error; and
   correcting the estimated frequency error.

9. The method of claim 1, wherein a modulation format of the physical layer header of the digitized signal is Binary Phase Shift Key (BPSK).

10. The method of claim 1, wherein resolving the phase ambiguity in the second phase estimate by comparing the second phase estimate to the first phase estimate comprises:
inverting the plurality of in-phase and quadrature values, in response to discovering that an angle difference between the second phase estimate and the first phase estimate is more than 90 degrees; and
recalculating the second phase estimate for the remaining portion by summing the plurality of inverted in-phase and quadrature values and dividing the summation by two.

11. A terminal for wireless signal recovery, the terminal comprising:
a receiver module configured to receive a wireless signal transmitted via satellite; and
a processor module, communicatively coupled with the receiver module, and configured to:
identify a frame identifier in a physical layer header of the received wireless signal;
utilize the identified frame identifier to estimate a first phase associated with the frame identifier; and
utilize a remaining portion of the physical layer header to estimate a second phase associated with the remaining portion, wherein estimating the second phase is based on doubling a phase angle associated with the remaining portion and comprises:
doubling the phase angle associated with the remaining portion;
calculating the second phase estimate for the remaining portion by summing a plurality of in-phase and quadrature values and dividing the summation by two; and
resolving a phase ambiguity in the second phase estimate by comparing the second phase estimate to the first phase estimate.

12. The terminal of claim 11, wherein the processor module is further configured to:
utilize the first phase estimate and the second phase estimate to generate a first combined phase estimate associated with the physical layer header.

13. The terminal of claim 12, wherein the processor module is further configured to:
decode the remaining portion utilizing the first combined phase estimate.

14. The terminal of claim 13, wherein the processor module is further configured to:
utilize the decoded remaining portion to estimate a third phase.

15. The terminal of claim 13, wherein the processor module is further configured to:
utilize the decoded remaining portion to estimate a third phase for the remaining portion; and
combine the first phase estimate and the third phase estimate to generate a second combined phase estimate.

16. The terminal of claim 11, wherein the utilization of the remaining portion of the physical layer header to estimate the second phase associated with the remaining portion comprises:
utilizing a decoded version of the remaining portion of the physical layer header to estimate the second phase for the remaining portion.

17. The terminal of claim 11, wherein the processor module is further configured to:
identify a plurality of additional frame identifiers in the digitized signal;
estimate a phase for at least a subset of the additional frame identifiers; and
utilize the phase estimates for the additional frame identifiers in combination with the first phase estimate or the second phase estimate to adaptively adjust a combined phase estimate.

18. The terminal of claim 11, wherein a modulation format of the physical layer header of the received wireless signal is Binary Phase Shift Key (BPSK).

19. The terminal of claim 11, wherein resolving the phase ambiguity in the second phase estimate by comparing the second phase estimate to the first phase estimate comprises:
inverting the plurality of in-phase and quadrature values, in response to discovering that an angle difference between the second phase estimate and the first phase estimate is more than 90 degrees; and
recalculating the second phase estimate for the remaining portion by summing the plurality of inverted in-phase and quadrature values and dividing the summation by two.

* * * * *